US010822514B2

(12) United States Patent
Kritzinger et al.

(10) Patent No.: US 10,822,514 B2
(45) Date of Patent: Nov. 3, 2020

(54) STRETCHABLE COATINGS

(71) Applicant: Omya International AG, Oftringen (CH)

(72) Inventors: Johannes Kritzinger, Olten (CH); Joachim Schoelkopf, Oberkulm (CH); Mikael Larsson, Karlstad (SE); Micael Ragnarsson, Vålberg (SE)

(73) Assignee: Omya International AG, Oftringen (CH)

( * ) Notice: Subject to any disclaimer, the term of this patent is extended or adjusted under 35 U.S.C. 154(b) by 16 days.

(21) Appl. No.: 15/559,895

(22) PCT Filed: Mar. 31, 2016

(86) PCT No.: PCT/EP2016/057084
§ 371 (c)(1),
(2) Date: Sep. 20, 2017

(87) PCT Pub. No.: WO2016/156504
PCT Pub. Date: Oct. 6, 2016

(65) Prior Publication Data
US 2018/0057704 A1    Mar. 1, 2018

Related U.S. Application Data

(60) Provisional application No. 62/173,617, filed on Jun. 10, 2015.

(30) Foreign Application Priority Data

Mar. 31, 2015  (EP) .................................... 15161992

(51) Int. Cl.
| C09D 133/02 | (2006.01) |
| D21H 19/38 | (2006.01) |
| D21H 19/58 | (2006.01) |
| B41M 5/52 | (2006.01) |
| C09D 133/08 | (2006.01) |
| D21H 19/56 | (2006.01) |
| C09D 133/12 | (2006.01) |
| C08K 3/00 | (2018.01) |
| C09D 125/14 | (2006.01) |
| D21H 19/40 | (2006.01) |
| C08K 3/26 | (2006.01) |

(52) U.S. Cl.
CPC ............. *C09D 133/02* (2013.01); *B41M 5/52* (2013.01); *B41M 5/5218* (2013.01); *B41M 5/5254* (2013.01); *C08K 3/00* (2013.01); *C09D 125/14* (2013.01); *C09D 133/08* (2013.01); *C09D 133/12* (2013.01); *D21H 19/385* (2013.01); *D21H 19/40* (2013.01); *D21H 19/56* (2013.01); *D21H 19/58* (2013.01); *C08K 2003/265* (2013.01); *C08K 2201/005* (2013.01); *C08K 2201/006* (2013.01); *C08L 2201/54* (2013.01)

(58) Field of Classification Search
CPC .... B41M 5/52; B41M 5/5218; B41M 5/5254; C09D 133/12; C09D 133/08; C09D 133/02; C09D 125/14; D21H 19/56; D21H 19/58; D21H 19/385; D21H 19/40; C08K 3/00; C08K 2003/265; C08K 2201/006; C08K 2201/005; C08L 2201/54
USPC ......................................................... 428/514
See application file for complete search history.

(56) References Cited

U.S. PATENT DOCUMENTS

| 5,007,964 A | 4/1991 | Tsukisaka et al. |
| 6,866,383 B2 | 3/2005 | Naik et al. |
| 8,602,550 B2 | 12/2013 | Idei et al. |
| 8,609,210 B2 | 12/2013 | Nagoshi et al. |
| 2007/0213459 A1* | 9/2007 | Tamai ................ C08F 8/42 524/858 |
| 2007/0225436 A1* | 9/2007 | Tamai .................. C08L 83/04 524/860 |
| 2008/0245273 A1* | 10/2008 | Vyorkka ............... C04B 26/02 106/665 |
| 2010/0107531 A1 | 5/2010 | Hunsaker |
| 2010/0227949 A1* | 9/2010 | Tamai .................. C08F 299/00 523/400 |
| 2012/0107531 A1 | 5/2012 | Koji et al. |
| 2013/0042791 A1* | 2/2013 | Bluvol ................. C01F 11/18 106/464 |

(Continued)

FOREIGN PATENT DOCUMENTS

| EP | 3075905 A1 | 5/2016 |
| JP | 2004034456 A | 2/2004 |

(Continued)

OTHER PUBLICATIONS

Product Data Sheet for UCAR Latex 169s (Year: 2008).*

(Continued)

*Primary Examiner* — Angela C Scott

(74) *Attorney, Agent, or Firm* — ALGM LLP; Harry J. Guttman

(57) ABSTRACT

The present invention relates to aqueous coating compositions for stretchable coatings in paper applications comprising at least one acrylic polymeric binder having a $T_g$ of −3° C. or lower, and at least one inorganic filler having a BET specific surface area in the range of 1.0 to 30.0 m²/g, wherein the dry weight ratio of the at least one acrylic polymeric binder to the at least one inorganic filler is between 15:100 and 20:100, as well as their use as stretchable coatings in paper and board applications.

24 Claims, 10 Drawing Sheets

(56) References Cited

U.S. PATENT DOCUMENTS

2014/0037890 A1* 2/2014 McJunkins ............ C09D 5/028
                                                                                           428/90
2018/0119358 A1* 5/2018 Larsson ................. B65D 1/34

FOREIGN PATENT DOCUMENTS

| JP | 2006082384 A | 3/2006 |
|----|--------------|--------|
| WO | 03/016045 A1 | 2/2003 |

OTHER PUBLICATIONS

Product Data Sheet for UCAR Latex 123 (Year: 2008).*
International Search Report dated Jun. 14, 2016 for PCT Application No. PCT/EP2016/057084.
Written Opinion of International Searching Authority dated Jun. 14, 2016 for PCT Application No. PCT/EP2016/057084.
Office Action dated Aug. 17, 2018 from Canadian Application No. 2,980,389.
European Search Report dated Sep. 18, 2015 from European Application No. 15161992.1.
Office Action dated Nov. 29, 2018 from Korean Application No. 10-2017-7031485.
Office Action dated Dec. 28, 2016 from Taiwanese Application No. 105110265.
International Preliminary Report on Patentability dated Oct. 12, 2017 from International Application No. PCT/EP2016/057084.

* cited by examiner

C1

C2

C3

C4

C5

A1　　　　　　　　A2　　　　　　　　A3

S1　　　　　　　　S2　　　　　　　　S3

K1　　　　　　　　K2　　　　　　　　K3

T1  T2  T3

P1  P2  P3

V1 + D1     V2 + D2

V2 + O1    V2 + O2

V2 + X1    V2 + X2

STRETCHABLE COATINGS

CROSS-REFERENCE TO RELATED APPLICATIONS

This is a U.S. national phase of PCT Application No. PCT/EP2016/057084, filed Mar. 31, 2016, which claims priority to European Application No. 15161992.1, filed Mar. 31, 2015 and U.S. Provisional Application No. 62/173,617, filed Jun. 10, 2015.

The present invention relates to aqueous coating compositions for stretchable coatings in paper applications, as well as the use of such aqueous coating compositions as stretchable coatings in paper applications.

In the field of paper making, it is of great interest to provide sheet like products, e.g. made of paper or plastics, which may be formed three-dimensionally, be it by embossing the papers or by forming them to obtain containers, such as trays or cups, which are especially useful for providing recyclable products, e.g. in the food industry.

However, not only the substrates have to be 3D formable, but also any coatings applied to their surface for different reasons such as for providing a better printability, resistance to crack formation, optical properties, etc.

Coating layers of coated papers are usually stiff structures that break once they are deformed beyond their fracture limit. Examples are fold crack of woodfree coated papers or board or breaks in embossing. In 3D forming of paper very high levels of elongation are experienced by the material. Common coatings, therefore, cannot be used because they will break due to their limited stretchability.

The coatings must be as equally stretchable as the substrate to which they are applied without forming any surface defects, such as cracks, and must improve the surface of the substrate such as providing higher whiteness, greater smoothness etc. Furthermore, they should not peel off the substrate, which is not only undesirable in view of a loss of function, but especially critical if used in food applications.

These and other problems were already investigated in the prior art, e.g. in JP 2004-034456 A and JP 2006-082384 A dealing with inkjet recording sheets comprising a substrate, which may be paper or a synthetic material, and an ink receiving layer, wherein the substrate is a formable material. For avoiding problems like cracks, etc., it is suggested to combine a binding agent comprising any kind of resin, but in any case having a 100% elongation modulus in a range of 0.1 to 40 MPa, and a filler. The content of the binding agent in such an elongation-stable ink receiving layer preferably is from 30 to 45 wt.-%, i.e. relatively high, and the content of filler preferably is from 43 to 50 wt.-%. Furthermore plasticizers, cationic substances, and other additives may be added to achieve the desired result.

In view of the known solutions for providing coatings, which are suitable to be form processed on specific substrates at a minimum of crack formation and negative impact on optical properties, there is still a need to provide such coatings, which are applicable to different substrates at a minimum binder level, which is highly desirable from an environmental and economical view, as well as for enhanced printability when using print processes that require an absorptive coating layer.

It has been found that a proper selection of binders having certain glass transition temperatures ($T_g$), and inorganic fillers having certain BET specific surface areas, and a combination of same at a certain weight ratio, solves the above problem.

Thus, the present invention relates to aqueous coating compositions for stretchable coatings in paper and board applications comprising:
- at least one acrylic polymeric binder having a $T_g$ of $-3°$ C. or lower, and
- at least one inorganic filler having a BET specific surface area in the range of 1.0 to 30.0 $m^2/g$, wherein the dry weight ratio of the at least one acrylic polymeric binder to the at least one inorganic filler is from 15:100 to 20:100.

Generally, the at least one acrylic polymeric binder may be any conventional binder comprising one or more monomers of acrylic acid and/or salts and/or derivatives thereof, such as e.g. methacrylates, methyl acrylate, ethyl acrylate, 2-ethylhexyl acrylate, hydroxyethyl methacrylate, butyl acrylate and butyl methacrylate, used in the field of paper and board coating, paints and coatings, textile treatment, and impregnations, having a $T_g$ of $-3°$ C. or lower.

In addition to acrylic binders also polyurethane-based binders, vinyl acetate-based binders and polyester resins having a $T_g<-3°$ C. may be suitable in aqueous coating compositions for stretchable coatings in paper and board applications comprising.

The "glass transition temperature ($T_g$)" is a well-known parameter to those skilled in the art, and is the temperature range, where a thermosetting polymer changes from a more pliable, compliant or "rubbery" state to a hard, rigid or "glassy" state upon cooling. The $T_g$ is usually measured using Differential Scanning calorimetry (DSC): ASTM E1356, "Standard Test Method for Assignment of the Glass Transition Temperature by Differential Scanning calorimetry". The $T_g$ is actually a temperature range, rather than a specific temperature. The convention, however, is to report a single temperature defined as the midpoint of the temperature range, bounded by the tangents to the two flat regions of the heat flow curve.

For the purpose of the present invention, it may be advantageous that the $T_g$ is lower than $-10°$ C., more preferably lower than $-20°$ C., and even more preferably lower than $-30°$ C. It may, e.g. be in the range of from $-5$ to $-46°$ C., preferably from $-10$ to $-40°$ C., more preferably from $-15$ to $-30°$ C., most preferably from $-20$ to $-25°$ C.

In a preferred embodiment of the invention the at least one acrylic polymeric binder is selected from the group comprising acrylic homopolymers, methacrylic homopolymers and copolymers composed of at least two different monomers, one monomer having an acrylic or methacrylic functional group and the other monomer having a functional group selected from the group consisting of styrene, vinyl and allyl; and mixtures thereof. It is especially preferred that the at least one acrylic polymeric binder is an acrylic homopolymer, a vinyl-acrylic copolymer, a styrene-acrylic copolymer, or mixtures thereof.

The at least one inorganic filler used in the present invention has a BET specific surface area in the range of 1 to 30 $m^2/g$. In a preferred embodiment, it has a BET specific surface area in the range of 2 to 20 $m^2/g$, preferably in the range of 4 to 15 $m^2/g$, and most preferably in the range of 5 to 13 $m^2/g$.

The BET specific surface area in the meaning of the present invention is defined as the surface area of the particles divided by the mass of the particles. As used therein the specific surface area is measured by adsorption using the BET isotherm (ISO 9277:1995) and is specified in $m^2/g$.

Accordingly, it may be advantageous to use relatively large filler particles having a smaller specific surface area. Furthermore, if too fine particles are present in high amounts, they may form flakes that increase the tendency to cracking of the coating. Accordingly, the amount of very small filler particles is preferably kept low. However, if the filler particles are too large or coarse, the printing surface may become too rough, which may result in unsatisfactory gloss and/or brightness.

It may be advantageous that the at least one inorganic filler has a weight median particle size $d_{50}$ in the range of 0.1 to 5 μm, preferably in the range of 0.3 to 3 μm, more preferably in the range of 0.4 to 2 μm, and most preferably in the range of 0.5 to 1.5 μm.

Furthermore, it may be preferred that the particle size $d_{98}$ of the at least one inorganic filler is in the range of 1 to 20 μm, preferably in the range of 2 to 12 μm, and most preferably in the range of 3 to 6 μm.

The value $d_x$ represents the diameter relative to which x % by weight of the particles have diameters less than $d_x$. This means that the $d_{98}$ value is the particle size at which 98 wt.-% of all particles are smaller. The $d_{98}$ value is also designated as "top cut". The $d_{50}$ value is thus the weight median particle size, i.e. 50 wt.-% of all grains are bigger and the remaining 50 wt.-% are smaller than this particle size. For the purpose of the present invention the particle size is specified as weight median particle size $d_{50}$ unless indicated otherwise. For determining the weight median particle size $d_{50}$ value or the top cut particle size $d_{98}$ value a Sedigraph 5100 or 5120 device from the company Micromeritics, USA, can be used.

The at least one inorganic filler is preferably selected from the group comprising calcium carbonate containing material, talc, kaolin, clay, titanium dioxide, satin white, bentonite and mixtures thereof, and is preferably selected from the group comprising calcium carbonate containing material, clay, kaolin and mixtures thereof, and is more preferably a calcium carbonate containing material.

If the at least one inorganic filler is a calcium carbonate containing material, it is preferably selected from the group consisting of natural ground calcium carbonate (GCC), precipitated calcium carbonate (PCC), dolomite and mixtures thereof, and is preferably natural ground calcium carbonate (GCC).

In this respect, natural ground calcium carbonate may be selected from the group consisting of marble, limestone, chalk and mixtures thereof, and precipitated calcium carbonate may be selected from R-PCC (rhombohedral PCC), S-PCC (scalenohedral PCC) and A-PCC (aragonitic PCC).

The at least one acrylic polymeric binder and the at least one inorganic filler preferably constitute at least 90 wt.-%, more preferably at least 92 wt.-%, even more preferably at least 95 wt.-%, and most preferably at least 98 wt.-% of the composition, based on the dry weight of the composition.

It was furthermore found that the stretchability of the coating is improved at relatively high ratios of the at least one binder to the at least one inorganic filler. It appears that a relatively high ratio prevents crack formation as the film formed by the binder is less interrupted when the amount of filler is lower. On the other hand, if the ratio is too high, printability of the coating surface may be insufficient.

The dry weight ratio of the at least one acrylic polymeric binder to the at least one inorganic filler is from 15:100 to 20:100, preferably from 16:100 to 19:100 and more preferably from 17:100 to 18:100, and it was found that these ratios provide good printability of the coating surface without deteriorating stretchability and increasing the formation of cracks.

The at least one inorganic filler is preferably present in the aqueous coating composition of the present invention in a range of 75 to 87 wt.-%, more preferably in a range of from 78 to 85 wt.-%, and most preferably in a range of from 80 to 82 wt.-%, based on the dry weight of the coating composition.

As regards the at least one acrylic polymeric binder, it is preferred that it is present in the aqueous composition of the present invention in a range of 12 to 17 wt.-%, more preferably in a range of from 13 to 15 wt.-%, e.g. 14 wt.-%, based on the dry weight of the coating composition.

In this respect, it is to note that the above weight-percentages of at least one inorganic filler and at least one acrylic polymeric binder may be selected independently from each other, i.e. may not result in a percentage of 100 wt.-%.

Accordingly, the aqueous coating composition of the present invention, may also furthermore contain conventional additives well-known in the art, and preferably contains at least one further additive selected from the group comprising thickeners, lubricants, dispersants, milling aids, rheology modifiers, defoamers, optical brighteners, dyes, pH controlling agents and mixtures thereof.

Independently of the amounts of at least one inorganic filler and at least one acrylic polymeric binder, the at least one further additive may be present in a range of from 0.1 to 8 wt.-%, preferably 0.2 to 6 wt.-%, more preferably 0.3 to 4 wt.-%, based on the dry weight of the coating composition.

The aqueous coating composition preferably has a solids content in the range of from 50 to 75 wt.-%, preferably in the range of 60 to 72 wt.-%, and most preferably in the range of 65 to 70 wt.-%, based on the total weight of the coating composition.

In this respect, any one of the components may, independently from each other, be provided in dry form, or in the form of suspensions, dispersions, slurries or solutions, and be mixed in any order. If any one of the components is added in dry form, water has to be added in order to obtain an aqueous coating composition.

The mixing of the components may be carried out by any suitable mixing means known to those skilled in the art for example a caddy mill.

In a special embodiment the aqueous coating composition may contain further solvents such as alcohol ethers, alcohols, aliphatic hydrocarbons, esters, and mixtures thereof.

Due to its superior properties upon stretching of a substrate coated with the aqueous coating composition according to the present invention, it is a further aspect of the present invention to use it as a stretchable coating in paper applications.

Accordingly, the substrate may be coated, once or several times, with the aqueous coating composition according to the present invention, wherein the coating may be carried out by conventional techniques well-known in the art and suitable for the respective substrates, e.g. by blade or roll coating, film press coating, curtain coating or any other technologies known to those skilled in the art.

The coat weight of each coating layer may be from 4 to 40 g/m$^2$, preferably from 5 to 35 g/m$^2$, more preferably from 5 to 30 g/m$^2$, most preferably from 8 to 25 g/m$^2$, e.g. from 15 to 20 g/m$^2$.

The substrate may be a substrate selected from the group comprising natural and synthetic paper, board and wallpaper, and is preferably stretchable, or formable, respectively.

The stretchability (measured according to ISO 1924/3) of the substrate preferably is at least 3% in the machine direction (MD) and/or the cross direction (CD), more preferably at least 5 or 7% in the machine direction (MD) and/or the cross direction (CD), most preferably at least 12% or 14% in the machine direction (MD).

An example of a suitable material for a paper substrate is FibreForm® marketed by BillerudKorsnäs AB (Sweden). In FibreForm®, the stretchability is at least 7% in the CD and at least 13% in the MD.

A paper substrate or paper layer having a stretchability of at least 5% in the machine direction (MD) and/or the cross direction (CD) is preferably at least partly obtained from chemical pulp, which generally has longer fibres than mechanical pulp. For example, the paper substrate or paper layer having such a stretchability may be composed of Kraft paper.

The substrate, preferably paper substrate, may comprise at least two layers, a top layer and a bottom layer, such as e.g. in laminates, wherein, preferably, the top layer will be coated with the composition. Optionally, the bottom layer may also be coated with the composition.

The coated substrate is advantageously dried, be it at room temperature or elevated temperatures.

The resulting coated substrate may be formed by any process known in the art for such purposes, e.g. by vacuum forming, thermo forming, air-pressure forming, and vacuum/air-pressure forming, moulding, etc.

After the forming step, the coating composition of the present invention preferably does not form major cracks having a negative impact on the structure of the formed article or its function, and does not significantly influence its optical properties, i.e. whiteness or smoothness of the final coated sheet that might also be printed in advance.

The following figures, examples and tests will illustrate the present invention, but are not intended to limit the invention in any way.

EXAMPLES

I. Measurement Methods

Figure 1A:
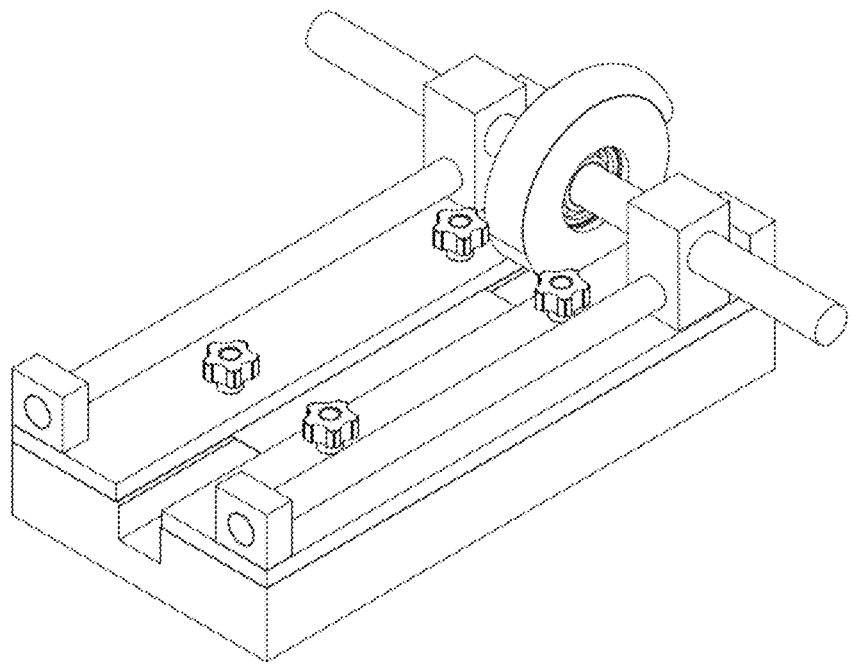
FIGS. 1a-d show a diagonal top view (FIG. 1a), side view (FIG. 1b), top view (FIG. 1c) and front view (FIG. 1d) of a 3D formability tester.
Figure 1B:
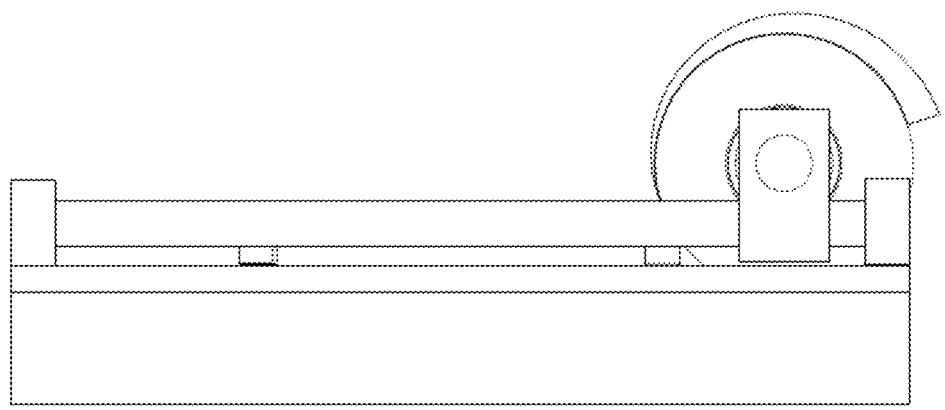
Figure 1C:
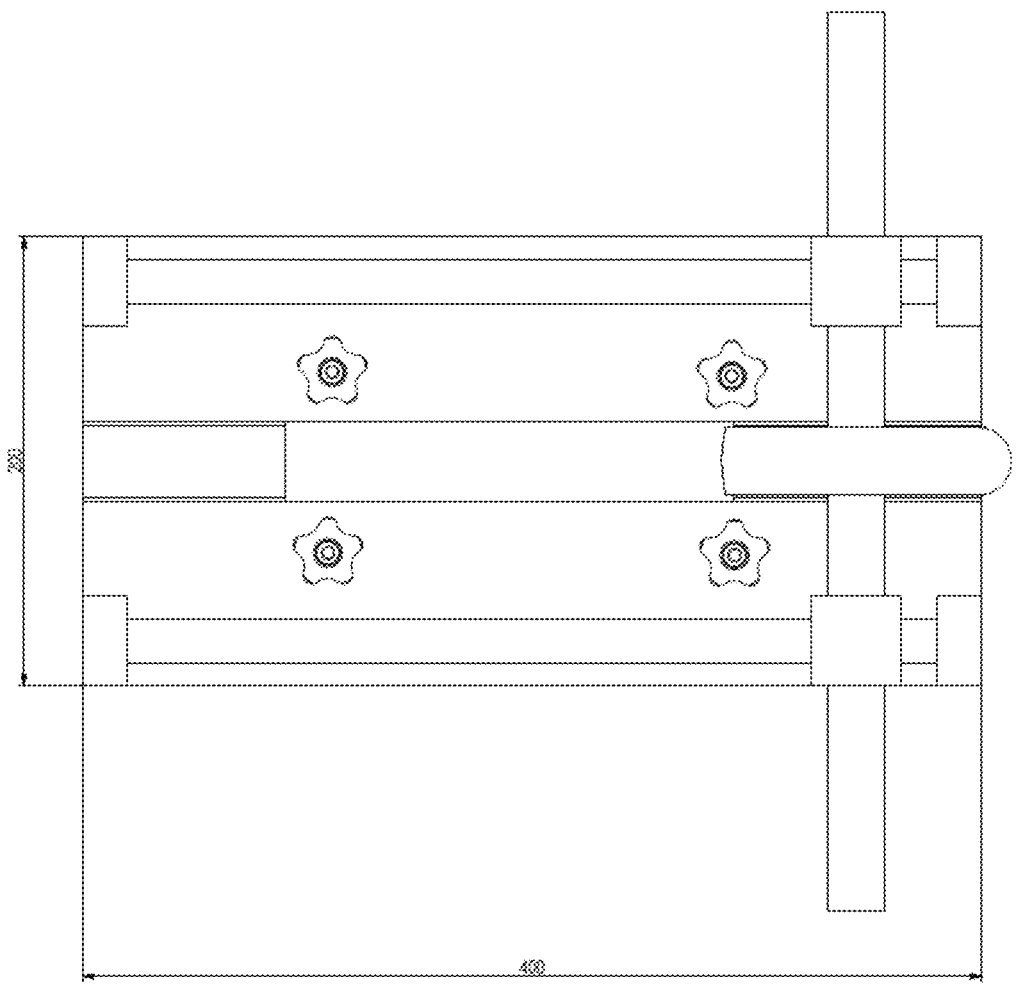
Figure 1D:
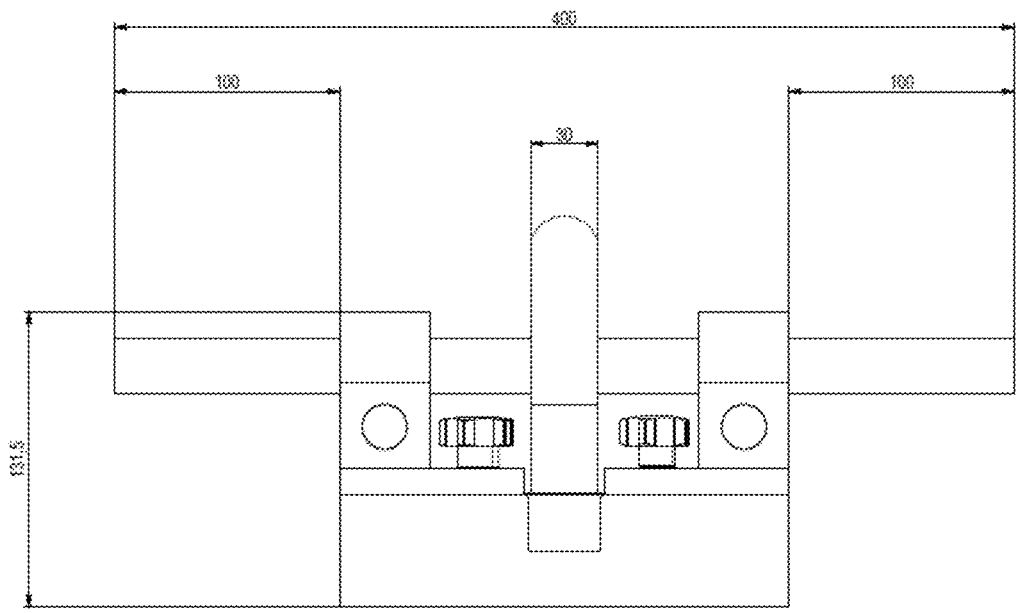
Figure 2A:
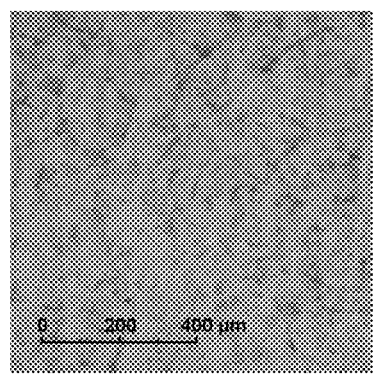
FIGS. 2a-e, 3 and 4 show microscope images of samples using different binders.
Figure 2B:
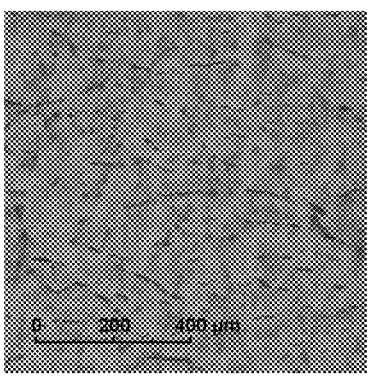
Figure 2C:
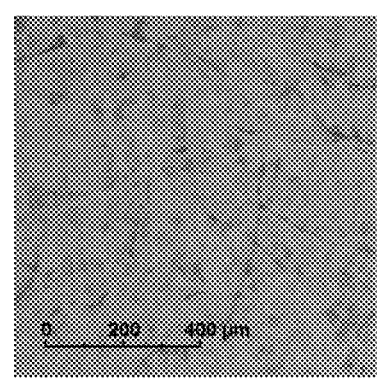
Figure 2D:
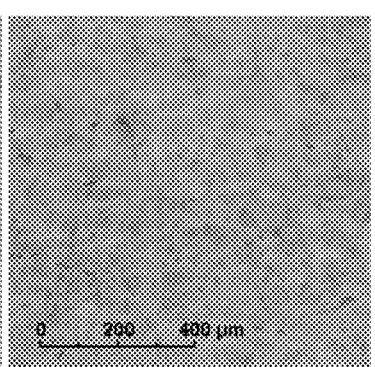
Figure 2E:
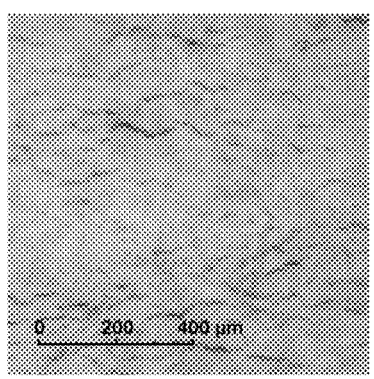

In the following, measurement methods implemented in the examples are described.

Particle Size Distribution

The $d_{50}$ and $d_{98}$ values were measured using a Sedigraph 5120 from the company Micromeritics, USA. The method and the instrument are known to the skilled person and are commonly used to determine grain size of fillers and pigments. The measurements were carried out in an aqueous solution comprising 0.1 wt.-% $Na_4P_2O_7$. The samples were dispersed using a high speed stirrer and supersonics. For the measurement of dispersed samples, no further dispersing agents were added.

Solids Content of an Aqueous Suspension

The suspension solids content (also known as "dry weight") was determined using a Moisture Analyser MJ33 from the company Mettler-Toledo, Switzerland, with the following settings: drying temperature of 160° C., automatic switch off if the mass does not change more than 1 mg over a period of 30 s, standard drying of 5 to 20 g of suspension.

Specific Surface Area (SSA)

The specific surface area was measured via the BET method according to ISO 9277 using nitrogen, following conditioning of the sample by heating at 250° C. for a period of 30 minutes. Prior to such measurements, the sample is filtered within a Büchner funnel, rinsed with deionised water and dried overnight at 90 to 100° C. in an oven. Subsequently the dry cake is ground thoroughly in a mortar and the resulting powder placed in a moisture balance at 130° C. until a constant weight is reached.

CIE Whiteness

CIE whiteness was determined via whiteness measurements according to ISO 11457.

Parker Print Surfaces (PPS) Smoothness

Surface smoothness given as Parker Print Surface was determined according to ISO 8791-4.

II. Material

1. Substrate

FibreForm® 3D paper of 100% primary fibre; basis weight of 100 g/m² (available from BillerudKorsnäs; Sweden). The paper is characterized by its high elongation at break.

2. Fillers

Filler 1: natural ground calcium carbonate; $d_{50}$=0.7 µm; $d_{98}$=5.0 µm; BET SSA=11.5 m²/g; solids content 78 wt.-% (available from Omya, Switzerland)

Filler 2: natural ground calcium carbonate; $d_{50}$=1.5 µm; $d_{98}$=10.0 µm; BET SSA=6.8 m²/g; solids content 78 wt.-% (available from Omya, Switzerland)

Filler 3: natural ground calcium carbonate; $d_{50}$=0.4 µm; $d_{98}$=2.0 µm; BET SSA=18.0 m²/g; solids content 75 wt.-% (available from Omya, Switzerland)

Filler 4: Clay No. 1 high brightness ultrafine clay; BET SSA=21 m²/g; solids content 73 wt.-% (available from Omya, Switzerland)

Filler 5: Sachtleben® R 320, rutile titanium dioxide; BET SSA=13 m²/g (available from Sachtleben Chemie GmbH, Germany 3. Binders Appretan® E2100: pure acrylic dispersion; $T_g$ −30° C. (available from Archroma)

Appretan® E6200: styrene/acrylic dispersion; $T_g$ −20° C. (available from Archroma)

Appretan® E4250: vinyl/acrylic dispersion; $T_g$ −15° C. (available from Archroma)

Primal® 325 GB: styrene/acrylic dispersion; $T_g$ −25° C. (available from Dow Chemical Company)

Primal® P-308 MS: styrene/acrylic dispersion; $T_g+8°$ C. (available from Dow Chemical Company)
Plextol® D270: aqueous emulsion of a thermoplastic acrylic polymer; $T_g$ −42° C. (available from Synthomer, Germany)
Plextol® D 5240: acrylic ester copolymer dispersion; $T_g$ −43° C. (available from Synthomer, Germany)
Plextol® X 4427: aqueous emulsion of an acrylic copolymer; $T_g$ −40° C. (available from Synthomer, Germany)
Litex® P 5100: carboxylated styrene/butadiene copolymer dispersion; Tg−2° C. (available from Synthomer, Germany)
Litex® SX 1024: styrene/buradiene copolymer dispersion; Tg−15° C. (available from Synthomer, Germany)
Litex® S 7641: self-crosslinking styrene/butadiene copolymer dispersion; Tg−44° C. (available from Synthomer, Germany)

4. Additives

Rheocarb® 101: steric rheology modifier (available from Coatex Arkema, France)
Rheocarb® 121: steric rheology modifier (available from Coatex Arkema, France)
PVA BF-04: fully hydrolyzed Polyvinylalcohol (available from Chang Chun Petrochemical Co., Ltd., Taiwan)

III. Methods

1. Coating Preparation

Different coating compositions were prepared and evaluated as described below. The respective filler slurries and binder slurries were combined in a beaker by gentle mixing resulting in coating compositions having initial solids contents given in the below tables. Subsequently, the aqueous coating composition was mixed under higher shear conditions without drawing air until the individual phases of the composition are visually homogenously mixed. For adjustment of a final solids content of the aqueous coating composition calculated amounts of water were added by mixing again under higher shear conditions without drawing air. All mixing steps were done with a Pendraulik Laboratory Dissolver, model LD 50.

2. Paper Coating

The coatings were applied to a substrate as described below.

3. Stretchability Testing Method

The coating layers applied to the stretchable paper were tested with a newly developed 3D formability tester that was developed by Omya and built by Norbert Schlä fli Maschinen (Zofingen). Schematic drawings indicating major dimensions of the formability tester built of aluminium are shown in FIG. 1. The key element is a profiled wheel with a diameter of 125 mm and a width of 30 mm. The profile covers half of the circumference of the wheel, and develops like a membrane in bulge tests from a flat surface to a semi-circle. The stretch level develops continuously along the profile having a total testing length of 19.6 cm (wheel diameter*pi/2) from 0% (30 mm stretching length and 30 mm stretched material) at the starting point to 57% (30 mm stretching length and 47.1 mm stretched material) at the end point. The wheel is part of an upper body of the testing instrument and is connected to two parallel rails that are also part of the upper body and guide the wheel when pulled manually for testing. The surface of the upper body that is showing towards the lower body is planar with the un-profiled section of the wheel. The lower body of the testing instrument is a massive block of aluminium with a 30 mm wide groove with broken edges not to cut the paper during testing when the profile is pressed into the paper. In order to avoid slipping paper during forming sandpaper can be glued just above the edge to firmly hold the testing paper between the upper and the lower body of the testing instrument.

For testing, paper is clamped between the upper and lower body of the testing instrument with the coated surface showing into the groove of the lower body. Due to the fact that papers e.g. FibreForm® have a higher elongation at break in the machine direction (the direction the paper is produced, MD) the sample should be cut in the paper cross direction (CD) to use the higher stretchability in the MD, the wheel rolls in the CD and the stretch developed by the width of the wheel is applied in the MD, respectively. A trained person operates the testing instrument to ensure comparable results with regard to testing speed, clamping force and starting point of the measurement. The wheel rolls over the paper due to friction between paper and wheel surface and presses the profile into the paper. Obvious breaks of FibreForm® material without coating as described above have stretch levels of ca. 35-40% or brake after ca. 12 cm testing length. Coated samples were tested after 10 cm testing length or 29% of stretch.

To better visualize cracks, the coated surface is painted with Neocarmin W (MERCK) a testing liquid for colouring cellulose fibres that are visible at the cracks and gently cleaned with a soft tissue. Samples sufficiently large for microscopic evaluation are cut from the middle of the test area at a testing length of 10 cm and glued to a flat carton board. A stereo microscope is used to image the sample (Leica) at about 16 times magnification.

These images can be used for qualitative evaluation or further analysed by image analysis means: see the exemplary source code for Octave below, returning the number of pixels associated with a detected crack in an input image below as well as providing an image highlighting the extracted cracks. For better comparison, one could scale the result value by the total number of pixels in an image.

Exemplary Source Code for Octave:

```
function scm ( );
dirlist=dir(pwd);
Result=[ ];
for i=3:length(dirlist)−2
   dirlist(i).name
   img=imread(dirlist(i).name);
   d=edge(img,"Prewitt");
   d=bwmorph(d,"dilate",2);
   imgname=dirlist(i).name;
   imgname=imgname(:,1:5);
   imlabel=strcat(imgname,"A",".jpg")
   imwrite(d,imlabel);
   d=d(3:size(d,1)−3,3:size(d,2)−3);
   res=sum(d(:));
   Result=[Result;i,res];
end
save RESULTS.txt "Result" "-ascii"
endfunction
```

IV. Experiments

The following experiments were carried out for investigating the stretchability of several coatings in 3D forming in terms of the formation of cracks and the influence on the colour density of printed coatings.

Accordingly, a substrate was coated, and printed, respectively, and subjected to 3D forming. Subsequently, the formation of cracks and the colour density were evaluated.

1. Formation of Cracks

The coating was applied to the substrate with a variable speed drawdown coater (K Control Coater 303 Model 625 available from Erichsen GmbH & Co. KG, Hemer, Germany; 12 speed steps increasing from 2 and 40 m/min and 10 application rods allowing increasing application weights at given speeds).

The coated samples were stretched in the 3D formability tester as described above.

Subsequently, the formation of cracks was investigated by the evaluation of microscope images.

The microscope images show coated surfaces that were exposed to a stretch level of approx. 29%. The "y-axis" represents the paper machine direction, the "x-axis" the paper cross direction. The image edge length is about 4 mm.

The first row of the respective images shows the microscope images of coated surfaces, the second row shows the results obtained by image analysis.

1.1. Evaluation of Binder Type

For evaluating binder types useful in the present invention, the following coating compositions were prepared and investigated.

The coating was applied to the substrate with a variable speed drawdown coater (K Control Coater 303 Model 625 available from Erichsen GmbH & Co. KG, Hemer, Germany; 12 speed steps increasing from 2 to 40 m/min and 10 application rods allowing increasing application weights at given speeds), and the samples analysed with the 3D formability testing method as described above.

TABLE 1

| Coating | C1 | C2 | C3 | C4 | C5 |
|---|---|---|---|---|---|
| Filler 1 (parts by weight) | 100 | 100 | 100 | 100 | 100 |
| Appretan E2100 (parts by weight) | 20 | | | | |
| Appretan E4250 (parts by weight) | | 20 | | | |
| Appretan E6200 (parts by weight) | | | 20 | | |
| Primal 325 GB (parts by weight) | | | | 20 | |
| Primal P-308 MS (parts by weight) | | | | | 20 |
| Rod #/Speed step | 3/4 | 3/4 | 3/3 | 3/2 | 3/2 |
| Coating Weight (g/m²) | 20.2 | 20.6 | 19.4 | 20.5 | 20.2 |
| Initial solids content (wt.-%) | 69.7 | 71.2 | 70.6 | 71.0 | 71.0 |
| Final solids content (wt.-%) | 61.4 | 61.5 | 61.5 | 60.8 | 61.5 |

TABLE 2

| Coating | A1 | A2 | A3 |
|---|---|---|---|
| Filler 1 (parts by weight) | 100 | 100 | 100 |
| Plextol ® D 270 (parts by weight) | 20 | | |
| Plextol ® D 5240 (parts by weight) | | 20 | |
| Plextol ® X 4427 (parts by weight) | | | 20 |
| Rod #/Speed step | 3/3 | 3/3 | 3/3 |
| Coating Weight (g/m²) | 19.0 | 20.5 | 19.8 |
| Initial solids content (wt.-%) | 71.3 | 71.3 | 70.0 |
| Final solids content (wt.-%) | 63.5 | 62.0 | 63.2 |

Figure 3:
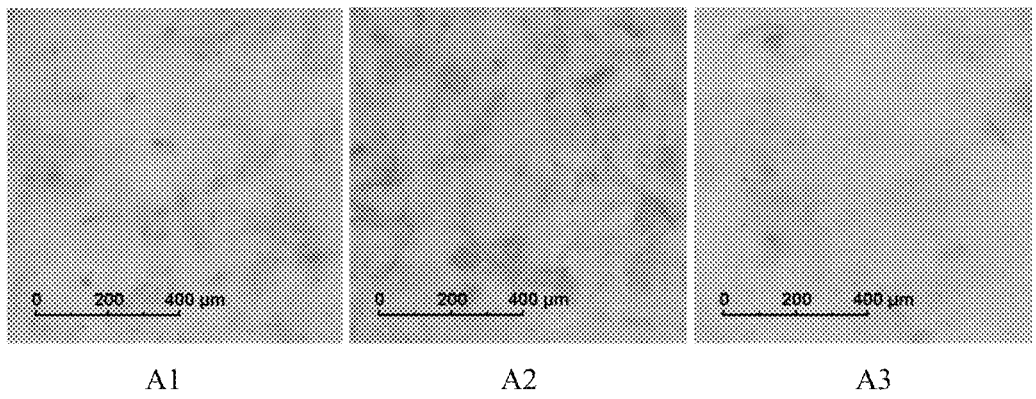

Table 3 summarizes typical "crack values", defined as the number of crack pixel divided by the total number of pixel in the image and gives a brief summary on the visual evaluation of the images shown in FIGS. 2 and 3:

TABLE 3

| | Visual evaluation |
|---|---|
| C1 | No visible cracks |
| C2 | Local tiny cracks |
| C3 | No visible cracks |
| C4 | No visible cracks |
| C5 | Long dominant cracks |
| A1 | Nearly no cracks |
| A2 | Nearly no cracks |
| A3 | Nearly no cracks |

The $T_g$ of acrylic binders obviously plays an important role, as can be seen from FIGS. 2a-e and FIG. 3. For the inventive samples with low $T_g$ binders (C1, C3 and C4, and A1-A3) almost no cracks can be seen in the original image. For inventive sample C2 cracks are visible, but are very short and located very locally. The visibility of these cracks does not lead to an exclusion of the corresponding binder from further considerations. Comparative sample C5, however, shows long dominant cracks, which are clearly not desirable.

Accordingly, it can be summarized that binders having low $T_g$ values are the binders of choice for stretchable coatings, wherein acrylic based binders appear to be especially advantageous.

Furthermore, the stretchability of non-acrylic polymeric binders were investigated.

Accordingly, the following comparative coating compositions using styrene butadiene based binders were prepared and evaluated.

TABLE 4

| Coating | S1 | S2 | S3 |
|---|---|---|---|
| Filler 1 (parts by weight) | 100 | 100 | 100 |
| Litex ® P 5100 (parts by weight) | 20 | | |
| Litex ® SX 1024 (parts by weight) | | 20 | |
| Litex ® S 7641 (parts by weight) | | | 20 |
| Rod #/Speed step | 3/3 | 3/3 | 3/3 |
| Coating Weight (g/m²) | 19.0 | 20.5 | 19.8 |
| Initial solids content (wt.-%) | 71.3 | 71.3 | 70.0 |
| Final solids content (wt.-%) | 63.5 | 62.0 | 63.2 |

Figure 4:
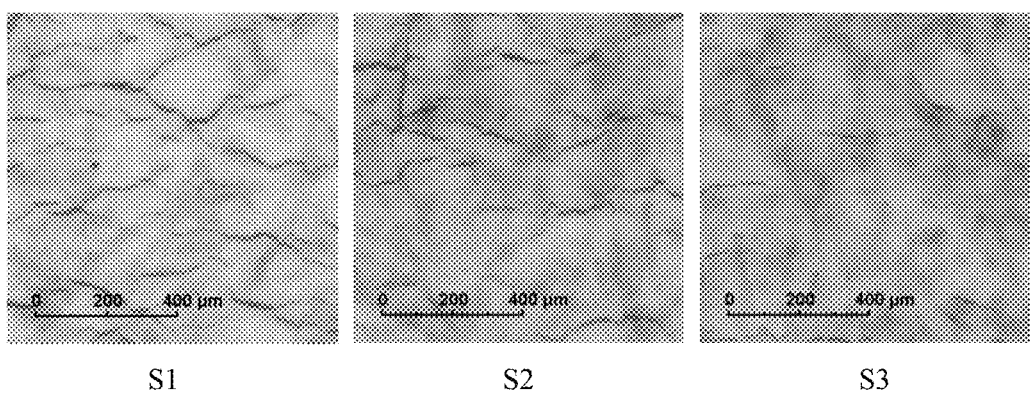

It is evident from FIG. 4 that styrene butadiene binders do not show the required stretchability. The visual evaluation of the images shown in FIG. 4 is summarized in Table 5.

TABLE 5

| | Visual evaluation |
|---|---|
| S1 | Heavy cracks |
| S2 | Heavy cracks |
| S3 | Obvious cracks |

1.2. Evaluation of Filler Type

The influence of clay as an example for fillers other than calcium carbonate containing material on the stretchability of coating colors was investigated, coating colors were prepared accordingly.

The coatings were applied with a Durrer continuous lab coating machine, using rod metering (C23, rod pressure of ca. 1 bar, rod revolution 12 rpm) at a coating speed of 20 m/min.

Coated paper surface properties were evaluated with regard to optical properties (CIE whiteness).

The 3D formability tests of the coated sheets were done as described above.

TABLE 6

| Coating | K1 | K2 | K3 |
|---|---|---|---|
| Filler 1 (parts by weight) | 100 | 75 | 50 |
| Filler 4 (parts by weight) |  | 25 | 50 |
| Appretan ® E6200 (parts by weight) | 20 | 20 | 20 |
| Rheocarb ® 101 (parts by weight) | 0.1 | 0.1 |  |
| Coating Weight (g/m$^2$) | 19.5 | 18.0 | 18.3 |
| Initial solids content (wt.-%) | 70.5 | 69.4 | 68.4 |
| Final solids content (wt.-%) | 60.0 | 59.9 | 59.0 |

Figure 5:
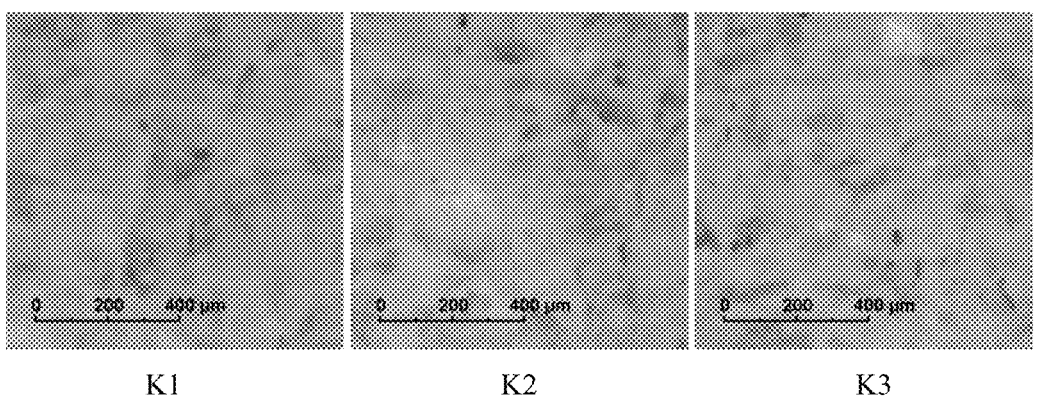
FIG. 5 shows microscope images of samples using different fillers.

The microscope images in FIG. 5 indicate good stretchability of coating layers also for the clay containing samples. Only a few and tiny cracks can be observed. Table 7 summarizes the visual evaluation of the images in FIG. 5.

TABLE 7

|  | Visual evaluation |
|---|---|
| K1 | Nearly no cracks |
| K2 | Nearly no cracks |
| K3 | Nearly no cracks |

1.3. Evaluation of Filler/Binder Ratio

For evaluating filler/binder ratios useful in the present invention, the following coating compositions were prepared and investigated.

The coating was applied to the substrate with a variable speed drawdown coater (K Control Coater 303 Model 625 available from Erichsen GmbH & Co. KG, Hemer, Germany; 12 speed steps increasing from 2 and 40 m/min and 10 application rods allowing increasing application weights at given speeds), and the samples analyzed with the 3D formability testing method as described above.

TABLE 8

| Coating | T1 | T2 | T3 |
|---|---|---|---|
| Filler 1 (parts by weight) | 100 | 100 | 100 |
| Appretan E2100 (parts by weight) | 10 | 15 | 20 |
| Rod #/Speed step | 3/4 | 3/4 | 3/3 |
| Coating Weight (g/m$^2$) | 20.4 | 19.2 | 19.1 |
| Initial solids content (wt.-%) | 73.2 | 71.3 | 69.7 |
| Final solids content (wt.-%) | 63.0 | 63.1 | 61.4 |

Figure 6:
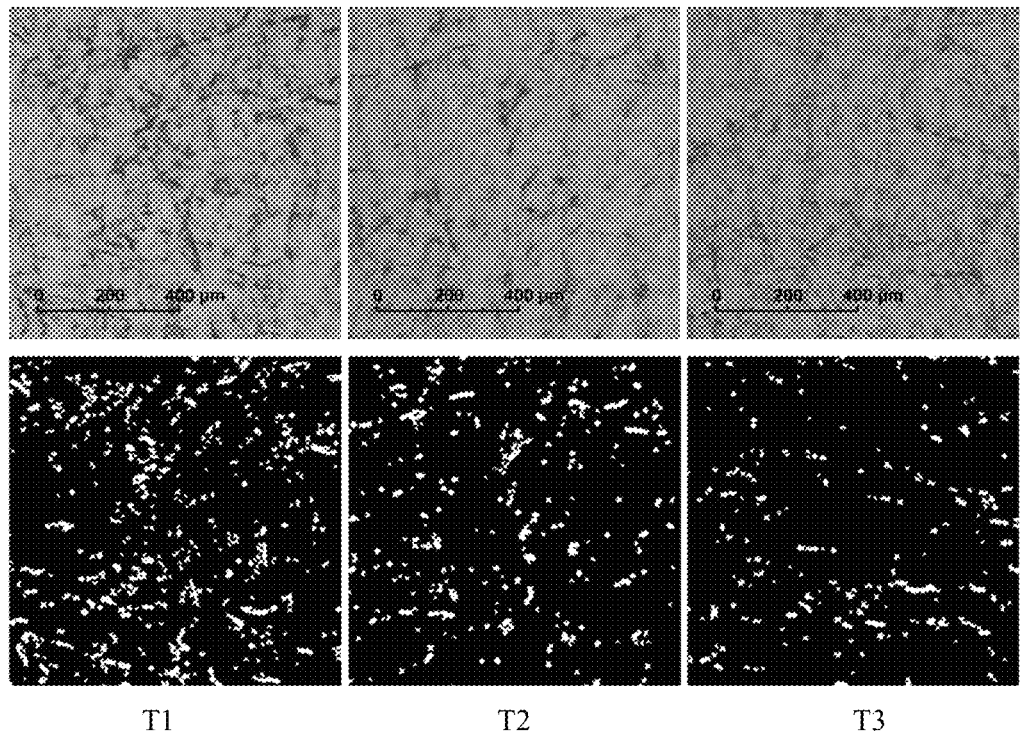
FIG. 6 shows microscope images and results of image analysis of samples having different binder levels.

Table 9 summarizes typical "crack values", defined as the number of crack pixel divided by the total number of pixel in the image and gives a brief summary on the visual evaluation of the images shown in FIG. 6:

TABLE 9

|  | Crack Number | Visual evaluation |
|---|---|---|
| T1 | 0.0963 | Clearly visible cracks |
| T2 | 0.0580 | Some cracks |
| T3 | 0.0442 | Almost no cracks |

FIG. 6 shows microscope images of coatings with different binder levels (T1-T3), the second row of images according results obtained from crack detection by image analysis. As can be taken from FIG. 6, increasing the binder levels decreases the number of cracks, wherein at a certain binder level no significant improvement can be detected any more.

1.4. Evaluation of Filler Particle Size

For evaluating filler particle sizes useful in the present invention, the following coating compositions were prepared and investigated.

The coating was applied to the substrate with a variable speed drawdown coater (K Control Coater 303 Model 625 available from Erichsen GmbH & Co. KG, Hemer, Germany; 12 speed steps increasing from 2 and 40 m/min and 10 application rods allowing increasing application weights at given speeds), and the samples analyzed with the 3D formability testing method as described above

TABLE 10

| Coating | P1 | P2 | P3 |
|---|---|---|---|
| Filler 2 (parts by weight) | 100 |  |  |
| Filler 1 (parts by weight) |  | 100 |  |
| Filler 3 (parts by weight) |  |  | 100 |
| Appretan E2100 (parts by weight) | 20 | 20 | 20 |
| Rod #/Speed step | 3/2 | 3/3 | 3/2 |
| Coating Weight (g/m$^2$) | 19.0 | 19.1 | 19.2 |
| Initial solids content (wt.-%) | 69.7 | 69.8 | 67.2 |
| Final solids content (wt.-%) | 63.2 | 61.4 | 56.8 |

Figure 7:
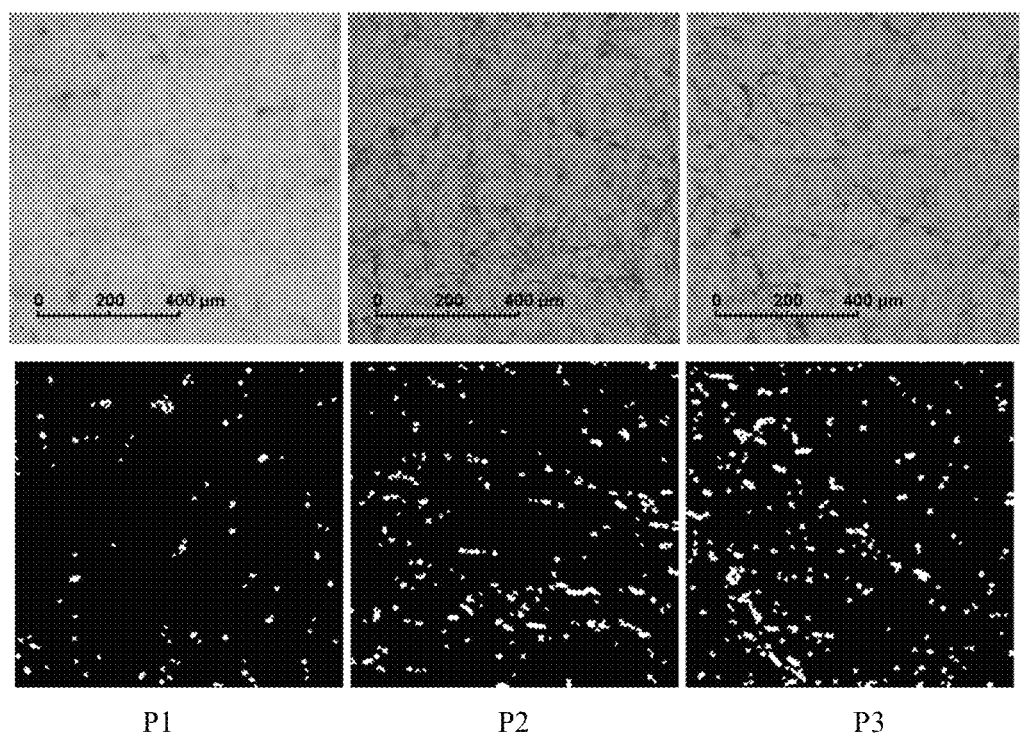
FIG. 7 shows microscope images and results of image analysis of samples using fillers having different particle sizes.

Microscope images of coatings made from particles with different particle size are shown in the first row of FIG. 7, according images with detected cracks in the second row. Table 11 gives a summary on the measured values.

TABLE 11

|  | Count | Visual evaluation |
|---|---|---|
| P1 | 0.0265 | Nearly no cracks |
| P2 | 0.0442 | Some tiny cracks |
| P3 | 0.0590 | Many very tiny cracks |

As can be taken from FIG. 7, any one of the coatings provide good results. However, it appears that finer particles (P2, P3) lead to more cracks in the coating layer, whereas almost no cracks and an obviously dense coating layer can be found for coarser particles (P1).

1.5. Use of Thickeners

The influence of thickeners for adjusting coating color rheology on stretchability was investigated.

The coatings were applied with a Durrer continuous lab coating machine, using rod metering (C23, rod pressure of ca. 1 bar, rod revolution 12 rpm) at a coating speed of 20 m/min.

The 3D formability tests of the coated sheets were done as described above.

TABLE 12

| Coating | R1 | R2 |
|---|---|---|
| Filler 1 (parts by weight) | 100 | 100 |
| Appretan ® E6200 (parts by weight) | 20 | 20 |
| Rheocarb ® 101 (parts by weight) | 0.1 |  |
| Rheocarb ® 121 (parts by weight) |  | 0.1 |
| Coating Weight (g/m$^2$) | 19.5 | 18.6 |
| Initial solids content (wt.-%) | 70.5 | 70.5 |
| Final solids content (wt.-%) | 60.0 | 60.1 |

Figure 8:
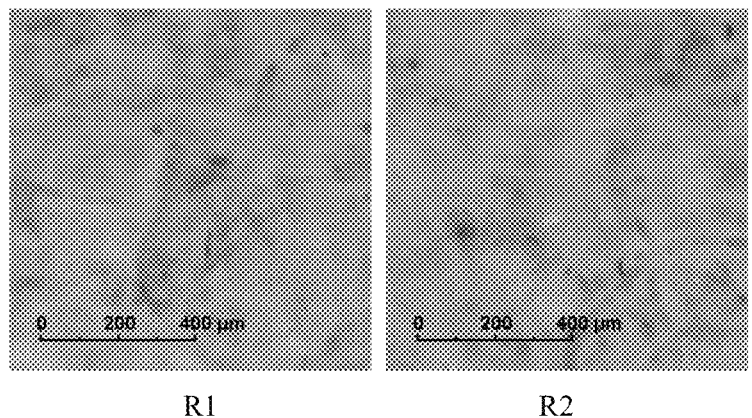
FIG. 8 shows microscope images of samples using thickeners.

FIG. 8 shows that addition of thickeners have no effect on stretchability by showing the same crack-pattern at a very low and acceptable level. Table 13 summarizes the visual evaluation of the images shown in FIG. 8.

TABLE 13

| | Visual evaluation |
|---|---|
| R1 | Nearly no cracks |
| R2 | Nearly no cracks |

2. Further Paper Surface Properties

The printing properties of the coatings according to the invention as well as changes in the printed image after paper forming were investigated by a continuous lab-scale coating and printing trial.

The coatings were applied with a Durrer continuous lab coating machine, using rod metering (C23, rod pressure of ca. 1 bar, rod revolution 12 rpm) at a coating speed of 20 m/min.

Coated paper surface properties were evaluated with regard to optical properties (CIE whiteness) and smoothness (Parker Print Surfaces).

The 3D formability tests of the coated sheets were done as described above.

TABLE 14

| Coating | W1 | W2 | W3 |
|---|---|---|---|
| Filler 1 (parts by weight) | 100 | 100 | 100 |
| Appretan E2100 (parts by weight) | 15 | | |
| Appretan E6200 (parts by weight) | | 15 | |
| Primal 325 GB (parts by weight) | | | 15 |
| Coating Weight (g/m$^2$) | 19.5 | 19.0 | 18.0 |
| Initial solids content (wt.-%) | 72.1 | 72.4 | 71.3 |
| Final solids content (wt.-%) | 58.3 | 58.7 | 58.1 |

Figure 9:
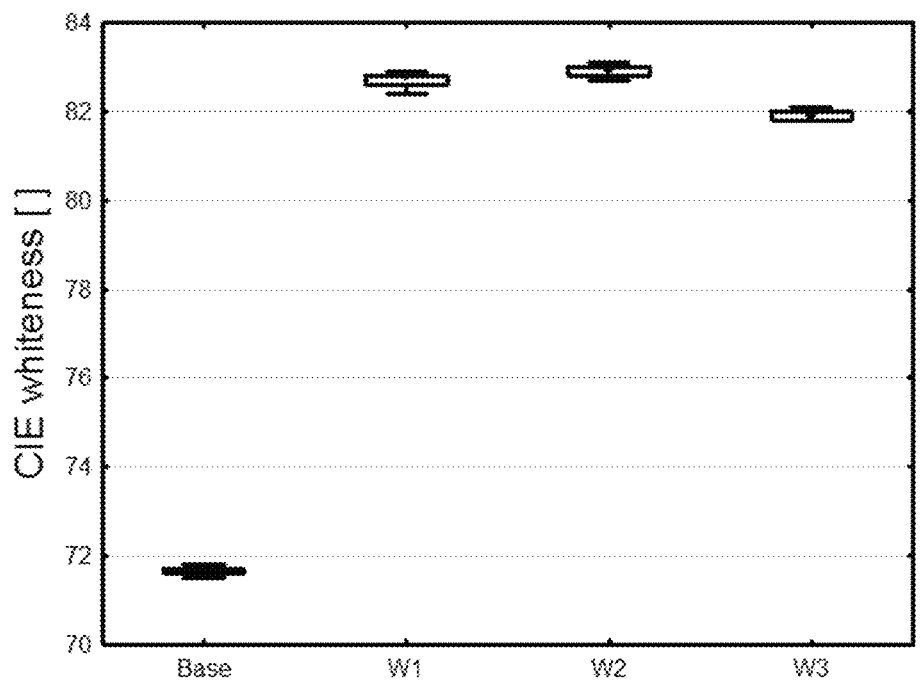
FIG. 9 shows the results of CIE whiteness measurement of different coatings.
Figure 10:
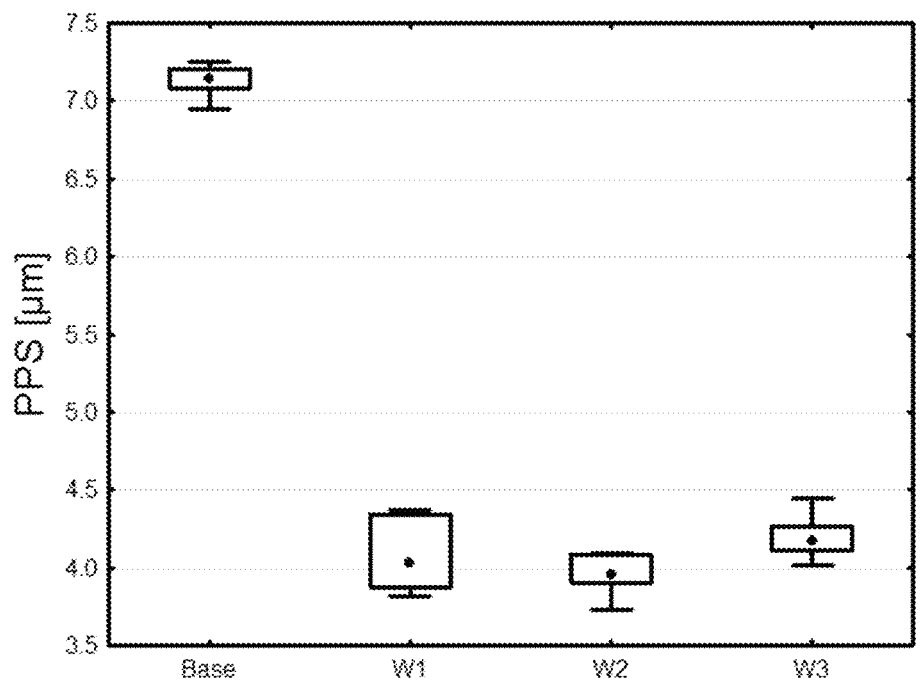
FIG. 10 shows the results of smoothness measurements of different coatings.

As expected, coating significantly improves the paper surface quality in terms of whiteness (FIG. 9) and smoothness (FIG. 10). Forming led to some tiny cracks in the coating layers clearly indicating the lower end of acceptable binder levels.

For evaluating the upper binder level useful in the present invention, the following coating compositions were prepared and investigated.

The coating was applied to the substrate with a variable speed drawdown coater (K Control Coater 303 Model 625 available from Erichsen GmbH & Co. KG, Hemer, Germany; 12 speed steps increasing from 2 and 40 m/min and 10 application rods allowing increasing application weights at given speeds), and the samples analyzed with the 3D formability testing method as described above

TABLE 15

| Coating | B1 | B2 | B3 |
|---|---|---|---|
| Filler 1 (parts by weight) | 100 | 100 | 100 |
| Appretan ® E6200 (parts by weight) | 20 | 30 | 40 |
| Rod #/Speed step | 3/2 | 3/2 | 4/2 |
| Coating Weight (g/m$^2$) | 19.8 | 19.0 | 19.1 |
| Initial solids content (wt.-%) | 70.6 | 68.1 | 66.1 |
| Final solids content (wt.-%) | 60.0 | 60.8 | 48.1 |

Figure 11:
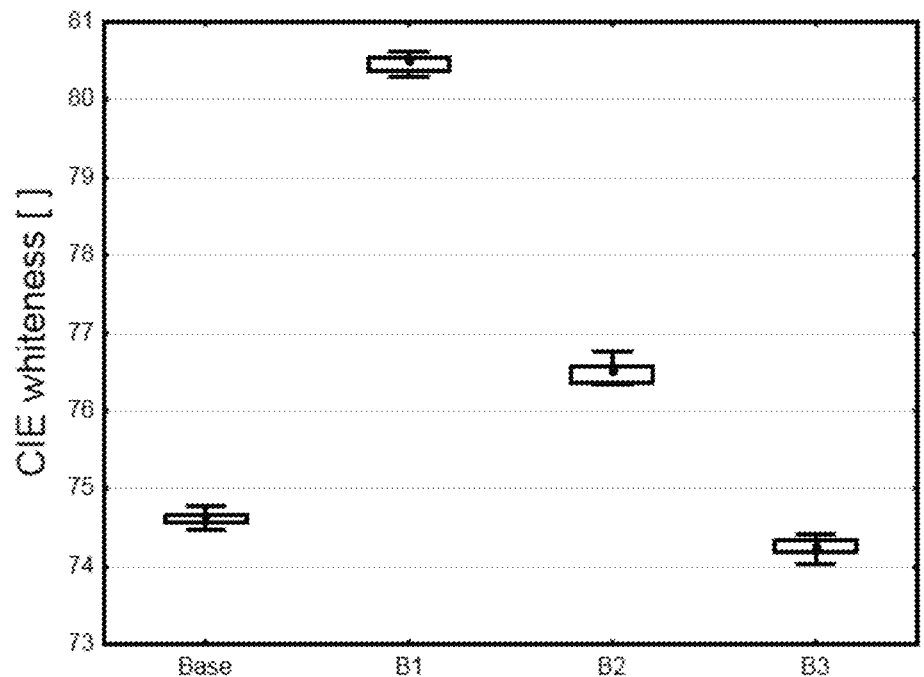
FIG. 11 shows the results of CIE whiteness measurement of different coatings having high binder levels.

FIG. 11 shows that coating becomes transparent at higher binder levels in the coating formulation. Thus, high binder levels are not beneficial for improving paper surfaces from an paper optical point of view.

3. Double Coating Experiments 3.1. Influence of Pre-Coat Weight

A double coating concept with stretchable coatings was evaluated. In a first experiment the influence of pre-coat weight was examined, according coating composition is given in the following.

The pre-coating layers were applied with a Durrer continuous lab coating machine, using rod metering (rod pressure of ca. 1 bar, rod revolution 12 rpm) at a coating speed of 20 m/min.

TABLE 16

| Coating | V1 | V2 |
|---|---|---|
| Filler 2 (parts by weight) | 100 | 100 |
| Appretan ® E6200 (parts by weight) | 20 | 20 |
| Coating Weight (g/m$^2$) | 11.0 | 15.3 |
| Initial solids content (wt.-%) | 72.1 | 72.1 |
| Rod type | C15 | C23 |
| Final solids content (wt.-%) | 54.1 | 57.0 |

On the pre-coats a top-coat with the following coating composition was applied.

TABLE 17

| Coating | D1 | D2 |
|---|---|---|
| Filler 1 (parts by weight) | 100 | 100 |
| Appretan ® E6200 (parts by weight) | 20 | 20 |
| Coating Weight (g/m$^2$) | 9.6 | 10.3 |
| Initial solids content (wt.-%) | 70.6 | 70.6 |
| Final solids content (wt.-%) | 55.4 | 55.4 |

The top-coating layers were applied with a Durrer continuous lab coating machine, using rod metering (C15, rod pressure of ca. 1 bar, rod revolution 12 rpm) at a coating speed of 20 m/min.

The 3D formability tests of the coated sheets were done as described above.

Figure 12:
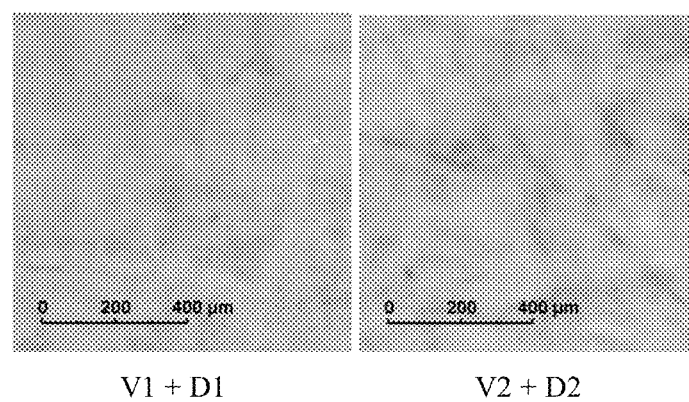
FIG. 12 shows microscope images of double-coated samples.

As shown in FIG. 12 higher pre-coat weights with stretchable coatings are beneficial for the overall stretchability of stretchable double layer coatings. The visual evaluation of the images presented in FIG. 12 are summarized in Table 18.

TABLE 18

| | Visual evaluation |
|---|---|
| V1 + D1 | Nearly no cracks |
| V2 + D2 | Nearly no cracks |

3.2. Use of Optical Brightening Agents

A double coating concept with stretchable coatings was evaluated. In an experiment the influence of optical brightening agents in the top-coat layer were evaluated.

As the pre-coat layer coating composition V2 described above was used. The pre-coating layers were applied with a Durrer continuous lab coating machine, using rod metering (C23, rod pressure of ca. 1 bar, rod revolution 12 rpm) at a coating speed of 20 m/min.

On the pre-coats a top-coat with the following coating composition was applied.

TABLE 19

| Coating | O1 | O2 |
|---|---|---|
| Filler 1 (parts by weight) | 100 | 100 |
| Appretan E6200 (parts by weight) | 20 | 20 |
| PVA BF-04 (parts by weight) | | 0.2 |
| Blancophor PT (parts by weight) | | 0.25 |
| Coating Weight (g/m$^2$) | 10.3 | 9.4 |
| Initial solids content (wt.-%) | 70.6 | 70.4 |
| Final solids content (wt.-%) | 55.4 | 56.8 |

The top-coating layers were applied with a Durrer continuous lab coating machine, using rod metering (C15, rod pressure of ca. 1 bar, rod revolution 12 rpm) at a coating speed of 20 m/min.

The 3D formability tests of the coated sheets were done as described above.

Figure 13:
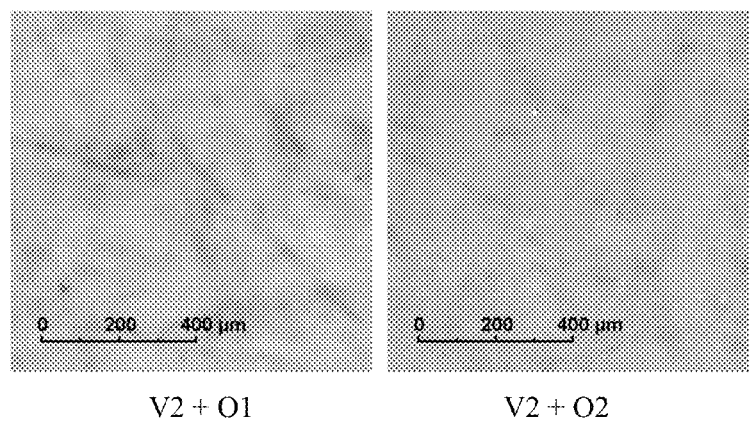
FIG. 13 shows microscope images of double-coated samples using optical brightening agents in the top-coat.

The images in FIG. 13 show that the use of OBA in the top-coat formulation of a double coating concepts does not influence the stretchability of the coating layer. Table 20 gives an overview on the visual evaluation of the images presented in FIG. 13.

TABLE 20

|  | Visual evaluation |
| --- | --- |
| V2 + O1 | Nearly no cracks |
| V2 + O2 | Nearly no cracks |

3.3. Use of Different Fillers

A double coating concept with stretchable coatings was evaluated. In an experiment the influence of additional titanium dioxide in the top-coat formulation was evaluated.

As the pre-coat layer coating composition V2 described above was used. The pre-coating layers were applied with a Durrer continuous lab coating machine, using rod metering (C23, rod pressure of ca. 1 bar, rod revolution 12 rpm) at a coating speed of 20 m/min.

On the pre-coats a top-coat with the following coating composition was applied.

TABLE 21

| Coating | X1 | X2 |
| --- | --- | --- |
| Filler 1 (parts by weight) | 100 | 80 |
| Filler 5 (parts by weight) |  | 20 |
| Appretan E6200 (parts by weight) | 20 | 20 |
| Coating Weight (g/m²) | 10.3 | 10.0 |
| Initial solids content (wt.-%) | 70.6 | 69.6 |
| Final solids content (wt.-%) | 55.4 | 57.2 |

The top-coating layers were applied with a Durrer continuous lab coating machine, using rod metering (C15, rod pressure of ca. 1 bar, rod revolution 12 rpm) at a coating speed of 20 m/min.

The 3D formability tests of the coated sheets were done as described above.

Figure 14:
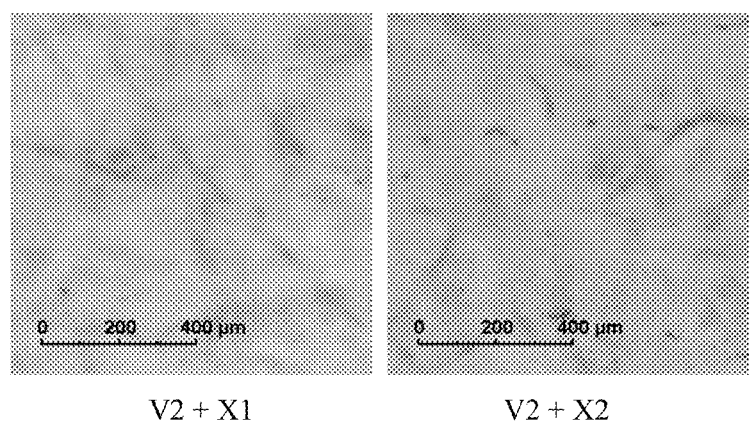
FIG. 14 shows microscope images of double-coated samples using different fillers.

In FIG. 14 it can be seen that addition of $TiO_2$ to the top-coat formulation results in tiny local cracks when stretching the coating layer which are considered as not disturbing and acceptable. Table 22 gives a summary on the visual evaluation of the images shown in FIG. 14.

TABLE 22

|  | Visual evaluation |
| --- | --- |
| V2 + X1 | Nearly no cracks |
| V2 + X2 | Local tiny cracks |

The invention claimed is:

1. An aqueous coating composition for stretchable coatings in paper and board applications comprising:
   at least one acrylic polymeric binder having a $T_g$ of −15° C. or lower, and
   at least one inorganic filler having a BET specific surface area in the range of 1.0 to 30.0 m²/g,
   wherein (i) the dry weight ratio of the at least one acrylic polymeric binder to the at least one inorganic filler is from 15:100 to 20:100 and (ii) the at least one inorganic filler comprises a calcium carbonate containing material.

2. The coating composition according to claim 1, wherein the at least one acrylic polymeric binder has a $T_g$ in the range of from −15 to −46° C.

3. The coating composition according to claim 1, wherein the at least one acrylic polymeric binder has a $T_g$ in the range of from −15 to −40° C.

4. The coating composition according to claim 1, wherein the at least one acrylic polymeric binder has a $T_g$ of −20° C. or lower.

5. The coating composition according to claim 1, wherein the at least one inorganic filler has a BET specific surface area in the range of 2.0 to 20.0 m²/g.

6. The coating composition according to claim 1, wherein the at least one inorganic filler has a BET specific surface area in the range of 4.0 to 15.0 m²/g.

7. The coating composition according to claim 1, wherein the at least one inorganic filler has a BET specific surface area in the range of 5.0 to 13.0 m²/g.

8. The coating composition according to claim 1, wherein the at least one acrylic polymeric binder is selected from the group consisting of acrylic homopolymers, methacrylic homopolymers, and copolymers composed of at least two different monomers, one monomer having an acrylic or methacrylic functional group and the other monomer having a functional group selected from the group consisting of styrene, vinyl and allyl; and any mixture thereof.

9. The coating composition according to claim 1, wherein the at least one acrylic polymeric binder is selected from the group consisting of an acrylic homopolymer, a vinyl-acrylic copolymer, a styrene-acrylic copolymer, and any mixture thereof.

10. The coating composition according to claim 1, wherein the at least one inorganic filler has a weight median particle size $d_{50}$ in the range of 0.1 to 5.0 µm.

11. The coating composition according to claim 1, wherein the at least one inorganic filler has a weight median particle size $d_{50}$ in the range of 0.4 to 2.0 µm.

12. The coating composition according to claim 1, wherein the at least one inorganic filler has a particle size $d_{98}$ in the range of 1.0 to 20.0 µm.

13. The coating composition according to claim 1, wherein the at least one inorganic filler has a particle size $d_{98}$ in the range of 2.0 to 12.0 µm.

14. The coating composition according to claim 1, wherein the at least one inorganic filler further comprises talc, kaolin, clay, titanium dioxide, satin white, bentonite, or any mixture thereof.

15. The coating composition according to claim 1, wherein the at least one inorganic filler further comprises clay, kaolin, or any mixture thereof.

16. The coating composition according to claim 1, wherein the at least one inorganic filler comprises natural ground calcium carbonate (GCC), precipitated calcium carbonate (PCC), dolomite, or any mixture thereof.

17. The coating composition according to claim 1, wherein the at least one inorganic filler is natural ground calcium carbonate (GCC) selected from the group consisting of marble, limestone, chalk, and any mixture thereof.

18. The coating composition according to claim 1, wherein the at least one acrylic polymeric binder and the at least one inorganic filler constitute at least 90 wt.-%, of the composition, based on the dry weight of the composition.

19. The coating composition according to claim 1, wherein the coating composition has a solids content in the range of 50 to 75 wt.-%, based on the total weight of the coating composition.

20. The coating composition according to claim 1, further comprising one or more additives selected from the group consisting of thickeners, lubricants, dispersants, milling aids, rheology modifiers, defoamers, optical brighteners, dyes, and pH controlling agents.

21. The coating composition according to claim 1, wherein the at least one inorganic filler is present in a range of 75 to 87 wt.-%, based on the dry weight of the coating composition.

22. The coating composition according to claim 1, wherein the at least one acrylic polymeric binder is present in a range of 12 to 17 wt.-%, based on the dry weight of the coating composition.

23. The coating composition according to claim 1, wherein at least one further additive is present in a range of 0.1 to 8 wt.-%, based on the dry weight of the coating composition.

24. The coating composition according to claim 1, wherein the at least one inorganic filler is natural ground calcium carbonate (GCC).

* * * * *